(12) United States Patent
Chi

(10) Patent No.: US 10,761,337 B2
(45) Date of Patent: Sep. 1, 2020

(54) PROJECTING APPARATUS FOR SPREADING NON-DIFFRACTED LIGHT

(71) Applicant: HIMAX TECHNOLOGIES LIMITED, Tainan (TW)

(72) Inventor: Cheng-Hung Chi, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 149 days.

(21) Appl. No.: 16/111,231

(22) Filed: Aug. 24, 2018

(65) Prior Publication Data

US 2020/0064648 A1 Feb. 27, 2020

(51) Int. Cl.
*G02B 27/42* (2006.01)
*G02B 27/30* (2006.01)

(52) U.S. Cl.
CPC ......... *G02B 27/4233* (2013.01); *G02B 27/30* (2013.01)

(58) Field of Classification Search
CPC ............... G02B 27/42; G02B 27/4205; G02B 27/4227; G02B 27/4233; G02B 27/425; G02B 27/4261; G02B 27/30
See application file for complete search history.

(56) References Cited

U.S. PATENT DOCUMENTS

| 6,339,504 B1* | 1/2002 | Oliva | G02B 5/1876 |
| | | | 359/641 |
| 2008/0212185 A1 | 9/2008 | Fuse | |
| 2014/0307307 A1* | 10/2014 | Georgiou | G06F 12/00 |
| | | | 359/355 |

FOREIGN PATENT DOCUMENTS

TW 200728767 8/2007

* cited by examiner

*Primary Examiner* — Robert E. Tallman
(74) *Attorney, Agent, or Firm* — Winston Hsu

(57) ABSTRACT

The present invention provides a projecting apparatus. The projecting apparatus comprises: a light source, a lens, and a diffractive optical element (DOE). The light source is utilized for emitting a Gaussian beam. The lens has a focal length, and is utilized for receiving the Gaussian beam and generating a de-focused Gaussian beam, wherein a distance between the light source and the lens is not equal to the focal length. The DOE is designed for the de-focused Gaussian beam, and utilized for receiving the de-focused Gaussian beam and spreading out a non-diffracted light of the de-focused Gaussian beam.

8 Claims, 5 Drawing Sheets

PROJECTING APPARATUS FOR SPREADING NON-DIFFRACTED LIGHT

BACKGROUND OF THE INVENTION

1. Field of the Invention

The present invention relates to a projecting apparatus, and more particularly, to a projecting apparatus for spreading non-diffracted light with lower cost.

2. Description of the Prior Art

In general, a diffractive optical element (DOE) is a popular patterning element contained in a structure light module. An ideal DOE can be used as a beam-shaping element with very high efficiency. However, the DOE production process in real world has some process errors such as corner rounding error and etching depth error, which will reduce performance. Illuminating a collimating beam into a general DOE will generate a non-diffracted light having high energy (e.g. over 1% of total energy of the collimating beam) which result in eye-safety problems.

Please refer to FIG. 1. FIG. 1 shows a simplified block diagram of a conventional projecting apparatus 100. The projecting apparatus 100 comprises: a laser light source 110, a collimating lens 120, and a DOE 130. The laser light source 110 generates a beam, and the collimating lens 120 receives the beam and generates a collimating beam. The focal length of the collimating lens 120 is represented by f, and a distance between the laser light source 110 and the collimating lens 120 is equal to the focal length f. The DOE 130 receives the collimating beam and generates a non-diffracted light having high energy on the image plane 140. For example, under a condition of 7 mm aperture and 70 cm distance between the DOE 130 and the image plane 140, if the DOE has an etching depth error of 10%, then the non-diffracted light has about 5.28% of total energy of the collimating beam; if the DOE has an etching depth error of 30%, then the non-diffracted light has about 36.26% of total energy of the collimating beam.

Please refer to FIG. 2. FIG. 2 shows a simplified block diagram of another conventional projecting apparatus according to Patent EP2987132B1. The projecting apparatus comprises a laser 204, a collimating lens 222, a DOE 224, and a refractive optical element (ROE) 226. The ROE 226 defocuses the non-diffracted light from the DOE 224 as represented in FIG. 2 by the dashed diverging lines, so as to reduce the energy of the spread non-diffracted light. However, the additional ROE 226 makes the total height of the projecting apparatus increase a lot and the cost of the projecting apparatus much higher.

SUMMARY OF THE INVENTION

It is therefore one of the objectives of the present invention to provide a projecting apparatus to spread non-diffracted light with lower cost, so as to solve the above problem.

In accordance with an embodiment of the present invention, a projecting apparatus is disclosed. The projecting apparatus comprises: a light source, a lens, and a diffractive optical element (DOE). The light source is utilized for emitting a Gaussian beam. The lens has a focal length, and is utilized for receiving the Gaussian beam and generating a de-focused Gaussian beam, wherein a distance between the light source and the lens is not equal to the focal length. The DOE is designed for the de-focused Gaussian beam, and utilized for receiving the de-focused Gaussian beam and spreading out a non-diffracted light of the de-focused Gaussian beam.

In accordance with an embodiment of the present invention, a projecting apparatus is disclosed. The projecting apparatus comprises: a light source and a DOE. The light source is utilized for emitting a specific Gaussian beam. The DOE is designed for the specific Gaussian beam, and utilized for receiving the specific Gaussian beam and spreading out a non-diffracted light of the specific Gaussian beam.

Briefly summarized, the projecting apparatus disclosed by the present invention can reduce the energy of the spread non-diffracted light to avoid hurting eyes, and the expected pattern can still be obtained, and the projecting apparatus has lower cost since no additional ROE is required.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 1:
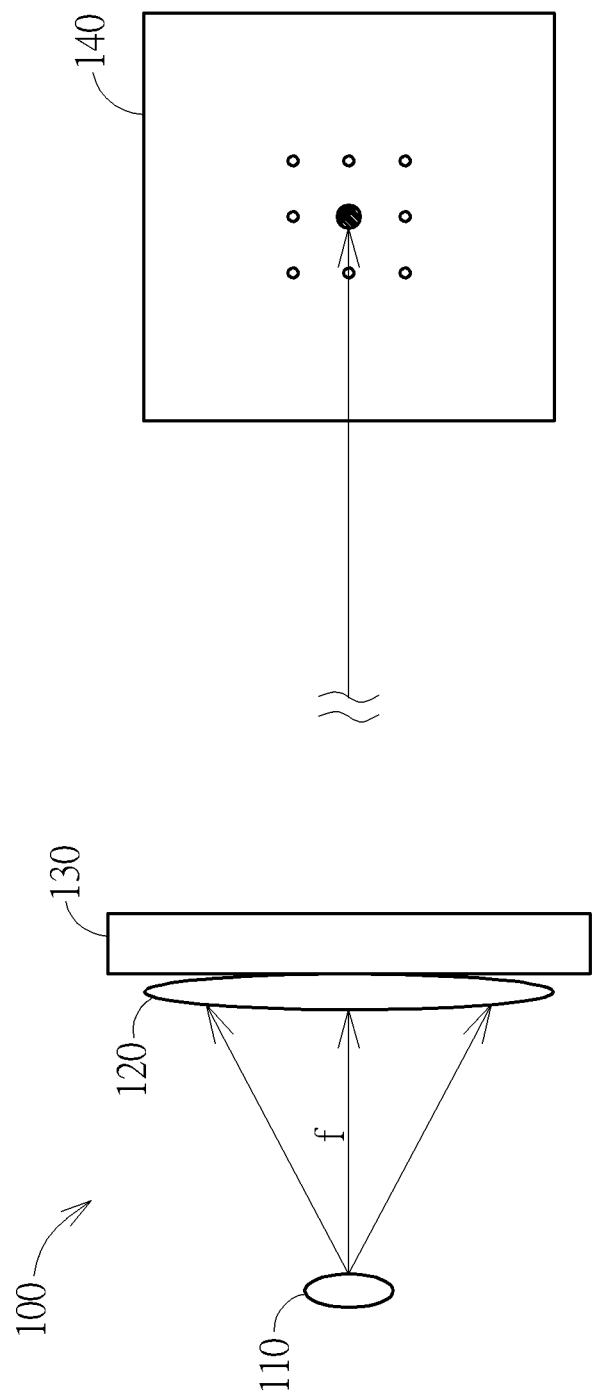
FIG. 1 shows a simplified block diagram of a conventional projecting apparatus.
Figure 2:
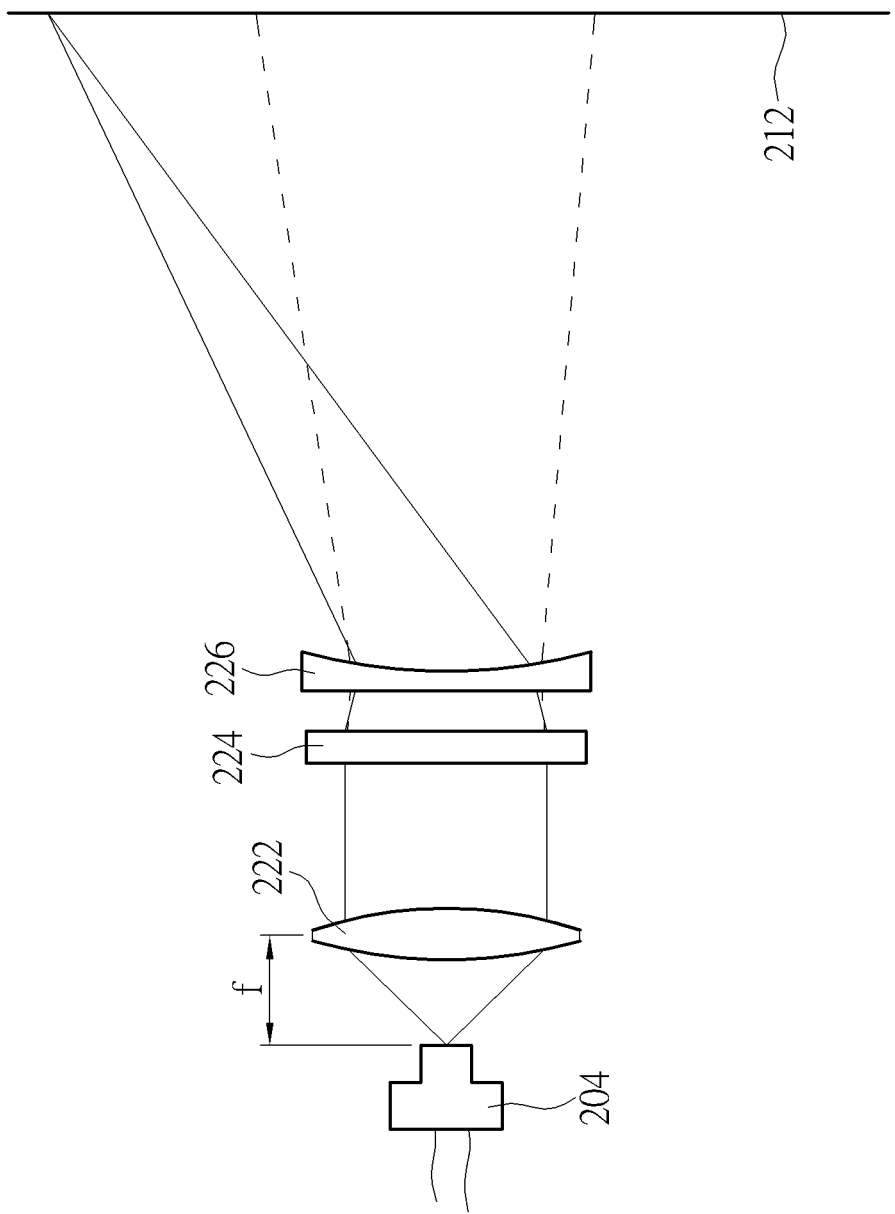
FIG. 2 shows a simplified block diagram of another conventional projecting apparatus according to Patent EP2987132B1.
Figure 3:
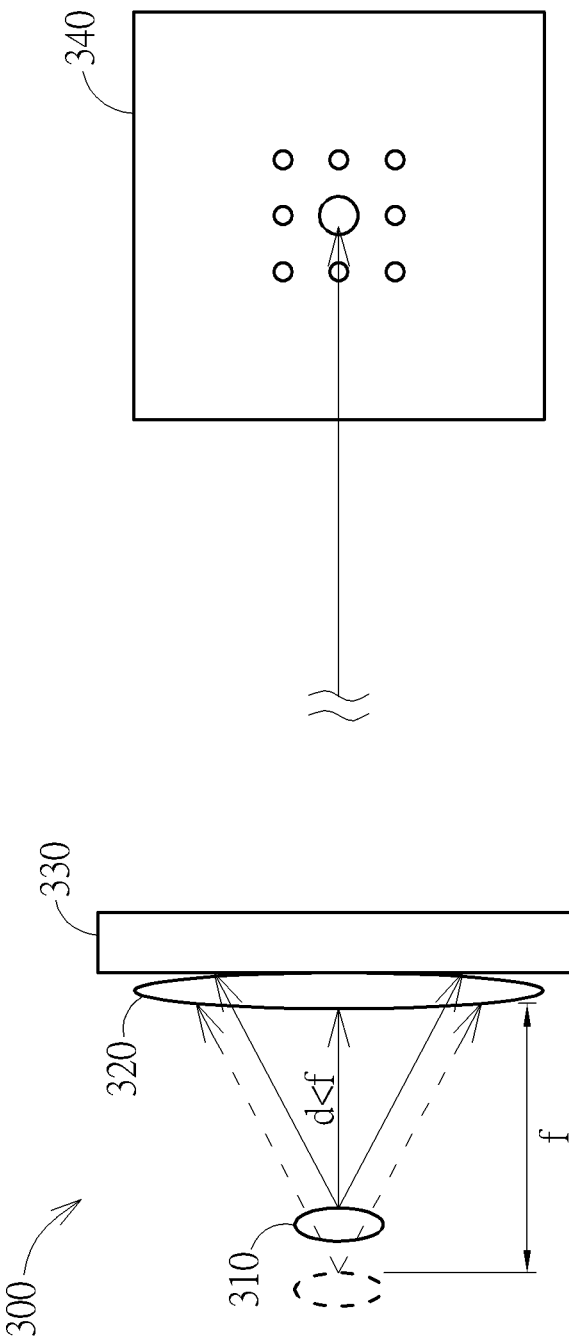
FIG. 3 shows a simplified block diagram of a projecting apparatus in accordance with an embodiment of the present invention.

Please refer to FIG. 3. FIG. 3 shows a simplified block diagram of a projecting apparatus 300 in accordance with an embodiment of the present invention, wherein the projecting apparatus 300 can be applied to a 3D sensing system. The projecting apparatus 300 comprises: a light source 310, a lens 320, and a diffractive optical element (DOE) 330, wherein the light source 410 can be a single wavelength laser light source, and the lens 320 can be a collimating lens. The light source 310 is utilized for emitting a Gaussian beam. The lens 320 has a focal length represented by f, and is utilized for receiving the Gaussian beam and generate a de-focused Gaussian beam, wherein a distance d between the light source 310 and the lens 320 is shorter than the focal length f, and the focal length can be an effective focal length (EFL). The DOE 330 is designed for the de-focused Gaussian beam, and utilized for receiving the de-focused Gaussian beam and only spreading out a non-diffracted light (i.e. zero-order beam, positioned in center of an image plane 340) of the de-focused Gaussian beam on the image plane 340. In this way, the energy of the spread non-diffracted light will be reduced a lot to avoid hurting eyes, and the expected pattern can still be obtained since the DOE 330 is specially designed for the de-focused Gaussian beam, and the projecting apparatus 300 has lower cost since no additional ROE is required.

Figure 4:
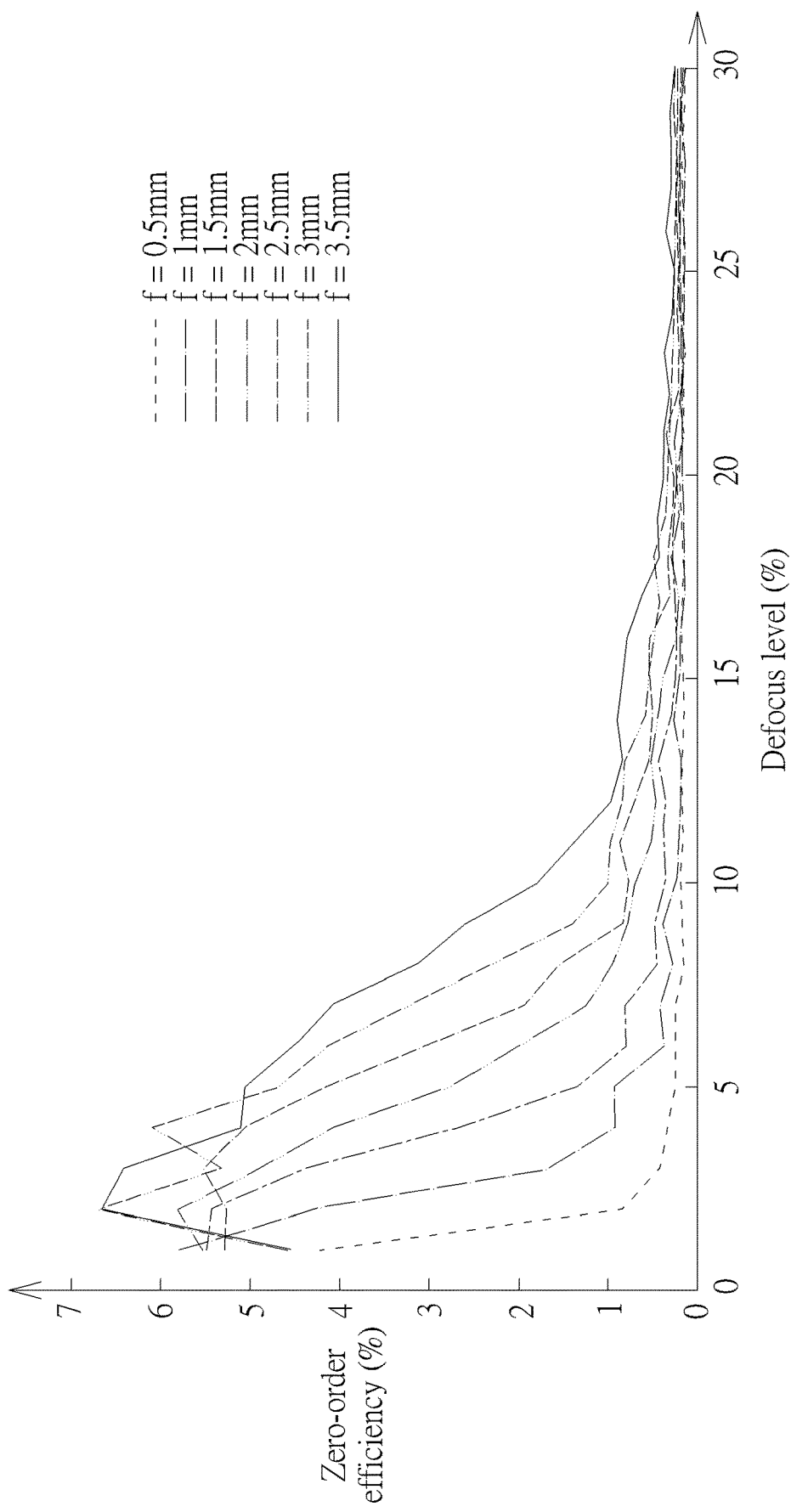
FIG. 4 shows a simplified diagram of the energy ratio of the non-diffracted light to total energy of the Gaussian beam (i.e. zero-order efficiency) and the defocus level of the light source and the lens (i.e. times of EFL) in accordance with different EFLs of the lens when the DOE has 10% etching depth error.

For example, under a condition of 7 mm aperture and 70 cm distance between the DOE 330 and the image plane 340, if the DOE 330 has an etching depth error of 10%, then the non-diffracted light has about 0.11% of total energy of the Gaussian beam; if the DOE 330 has an etching depth error of 30%, then the non-diffracted light has about 0.28% of total energy of the Gaussian beam. Please refer to FIG. 4. FIG. 4 shows a simplified diagram of the energy ratio of the non-diffracted light to total energy of the Gaussian beam (i.e. zero-order efficiency) and the defocus level of the light source 310 and the lens 320 (i.e. times of EFL) in accordance with different EFLs of the lens 320 when the DOE 330 has 10% etching depth error. For example, when the EFL of the lens 320 is 3.5 mm (i.e. f=3.5 mm), if the defocus level of the light source 310 and the lens 320 is 10% of the EFL (i.e. the distance d is 3.5 mm+/−(3.5*0.1)mm), the zero-order efficiency will be about 1.7%; if the defocus level of the light source 310 and the lens 320 is 20% of the EFL (i.e. the distance d is 3.5 mm+/−(3.5*0.2)mm), the zero-order efficiency will be about 0.3%. When the EFL of the lens 320 is 0.5 mm (i.e. f=0.5 mm), if the defocus level of the light source 310 and the lens 320 is 10% of the EFL (i.e. the distance d is 0.5 mm+/−(0.5*0.1)mm), the zero-order efficiency will be about 0.2%; if the defocus level of the light source 310 and the lens 320 is 20% of the EFL (i.e. the distance d is 0.5 mm+/−(0.5*0.2)mm), the zero-order efficiency will be about 0.2%. When the EFL of the lens 320 is longer, a higher defocus level of the light source 310 and the lens 320 is required to reduce the energy of the spread non-diffracted light (i.e. reduce the zero-order efficiency) to avoid hurting eyes.

However, if the DOE 330 is designed for a plane wave but not the de-focused Gaussian beam, the non-diffracted light and all diffracted lights will be spread and the expected pattern will not be obtained. Please note that the above embodiment is merely for an illustrative purpose and is not meant to be a limitation of the present invention. For example, in another embodiment, the distance d between the light source 310 and the lens 320 can be longer than the focal length f according to different design requirements.

Figure 5:
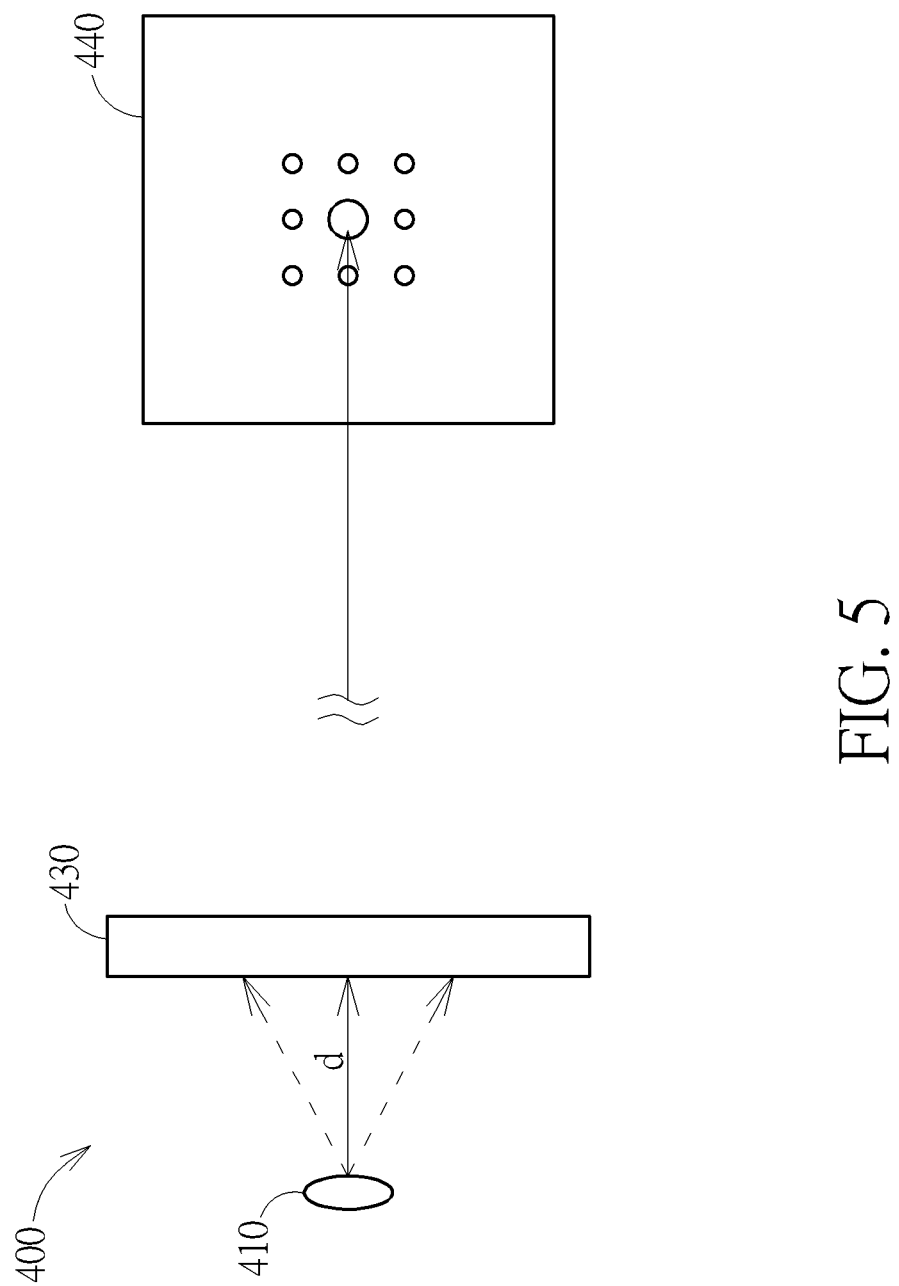
FIG. 5 shows a simplified block diagram of a projecting apparatus in accordance with another embodiment of the present invention.

Please refer to FIG. 5. FIG. 5 shows a simplified block diagram of a projecting apparatus 400 in accordance with another embodiment of the present invention, wherein the projecting apparatus 400 can be applied to a 3D sensing system. The projecting apparatus 400 comprises: a light source 410 and a DOE 420, wherein the light source 410 can be a single wavelength laser light source. The light source 410 is utilized for emitting a specific Gaussian beam. The DOE 430 is designed for the specific Gaussian beam, and utilized for receiving the specific Gaussian beam and spreading out a non-diffracted light (i.e. zero-order beam, positioned in center of an image plane 340) of the specific Gaussian beam on the image plane 440. The DOE 430 can be made by using more level of mask in binary optics. The total height of the projecting apparatus 400 can be reduced and the cost is much lower than the prior art. In this way, the energy of the spread non-diffracted light will be reduced a lot to avoid hurting eyes, and the expected pattern can still be obtained since the DOE 430 is specially designed for the specific Gaussian beam.

For example, under a condition of 7 mm aperture and 70 cm distance between the DOE 430 and the image plane 440, if the DOE 430 has an etching depth error of 10%, then the non-diffracted light has about 0.11% of total energy of the Gaussian beam; if the DOE 430 has an etching depth error of 30%, then the non-diffracted light has about 0.28% of total energy of the Gaussian beam.

Please note that the above embodiment is merely for an illustrative purpose and is not meant to be a limitation of the present invention. For example, in another embodiment, the distance d between the light source 410 and DOE 430 can be changed according to different design requirements.

Briefly summarized, the projecting apparatus disclosed by the present invention can reduce the energy of the spread non-diffracted light to avoid hurting eyes, and the expected pattern can still be obtained, and the projecting apparatus has lower cost since no additional ROE is required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projecting apparatus, comprising:
   a light source, for emitting a Gaussian beam;
   a lens, having a focal length, for receiving the Gaussian beam and generating a de-focused Gaussian beam, wherein a distance between the light source and the lens is not equal to the focal length; and
   a diffractive optical element (DOE), designed for the de-focused Gaussian beam, for receiving the de-focused Gaussian beam and spreading out a non-diffracted light of the de-focused Gaussian beam;
   wherein the DOE only spreads out a zero-order beam of the de-focused Gaussian beam on an image plane.

2. The projecting apparatus of claim 1, wherein the light source is a laser light source.

3. The projecting apparatus of claim 1, wherein the distance between the light source and the lens is longer than the focal length.

4. The projecting apparatus of claim 1, wherein the distance between the light source and the lens is shorter than the focal length.

5. The projecting apparatus of claim 1, wherein the distance between the light source and the lens is determined according to the focal length of the lens.

6. A projecting apparatus, comprising:
   a light source, for emitting a specific Gaussian beam;
   a diffractive optical element (DOE), designed for the specific Gaussian beam, for receiving the specific Gaussian beam and spreading out a non-diffracted light of the specific Gaussian beam;
   wherein the DOE only spreads out a zero-order beam of the specific Gaussian beam on an image plane.

7. The projecting apparatus of claim 5, wherein the light source is a laser light source.

8. The projecting apparatus of claim 5, wherein the distance between the light source and the DOE is determined according to a designed focal length of the DOE.

* * * * *